United States Patent [19]

Ogawa et al.

[11] Patent Number: 4,849,491
[45] Date of Patent: Jul. 18, 1989

[54] CURABLE ORGANOPOLYSILOXANE COMPOSITION

[75] Inventors: Masahiko Ogawa; Meguru Kashida; Kenichi Isobe, all of Annaka, Japan

[73] Assignee: Shin-Etsu Chemical Co., Ltd., Tokyo, Japan

[21] Appl. No.: 165,165

[22] Filed: Mar. 7, 1988

[30] Foreign Application Priority Data

Mar. 6, 1987 [JP] Japan .................... 62-51640

[51] Int. Cl.$^4$ ............................. G08G 77/06
[52] U.S. Cl. ........................ 528/15; 528/31; 528/32; 525/478
[58] Field of Search ............... 528/31, 15, 32; 525/478

[56] References Cited

U.S. PATENT DOCUMENTS 3,933,882 1/1976 Lee et al. .................... 528/31
3,983,298 9/1976 Hahn et al. .................. 528/15

*Primary Examiner*—Melvyn I. Marquis
*Attorney, Agent, or Firm*—Foley & Lardner, Schwartz, Jeffery, Schwaab, Mack, Blumenthal & Evans

[57] ABSTRACT

A curable organopolysiloxane composition comprising:
(A) an organopolysiloxane having at least two aliphatic unsaturated hydrocarbon groups,
(B) a particular organohydrogenpolysiloxane having a group represented by the formula:

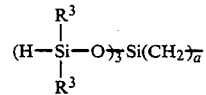

wherein $R^3$ is a substituted or unsubstituted monovalent hydrocarbon group and a is an integer of 2 or 3, and
(C) a platinum catalyst.

This composition has good curing properties, and the silicone film obtained by curing has good release properties which is stable for a long period of time.

12 Claims, No Drawings

CURABLE ORGANOPOLYSILOXANE COMPOSITION

BACKGROUND OF THE INVENTION

1. Field of the Invention

The present invention relates to a curable organopolysiloxane composition and particularly to a curable organopolysiloxane composition suitable for use in release purposes, particularly release papers.

2. Description of Prior Art

Heretofore, silicone films have been formed on substrates to give releasability to their surfaces for the purpose of preventing adhesive materials from strongly adhering to the surfaces and being peeled therefrom with difficulty.

For the formation of such silicone films, there have been generally used silicone compositions comprising an organopolysiloxane having an aliphatic unsaturated hydrocarbon group and an organohydrogenpolysiloxane having a silicon-bonded hydrogen atom, which may undergo addition reaction in the presence of a platinum catalyst to give a cured product. As the organohydrogenpolysiloxane in such silicone compositions, has been used a methylhydrogenpolysiloxane having the following structure unit containing the hydrogen atom bonded to the silicon atom:

Such a methylhydrogenpolysiloxane is represented, for example, by the formula:

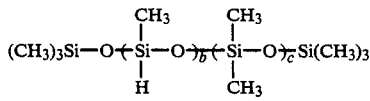

wherein b and c are each an integer.

However, where a silicone film is formed using the silicone composition as described above, the force necessary to peel a sticking adhesive applied to the silicone film from the silicone film (which force is hereinafter referred to as "peel force") has a tendency to gradually decrease with the passage of time from the formation of the silicone film to the application of the sticking adhesive on the silicone film. Also, the peel force has a tendency to gradually increase with the passage of time from the application of a sticking adhesive on the cured silicone film to the peeling of the adhesive from the silicone film. Thus, the release properties of the silicone films have a tendency to change with the passage of time. This tendency is greater where acrylic adhesives are used or where the amount of the silicone applied is small.

Moreover, the change of the release properties of the silicone films as mentioned above is remarkable when the silicone is insufficiently cured because of excessively low curing temperature or excessively short curing time. Therefore, controlling of the change of the release properties with time has been attempted by raising curing temperature or extending curing time. However, heating at high temperatures or for a long period of time is not only unfavorable in view of the loss of energy and the lowering of production efficiency, but also cannot necessarily give satisfactory release properties stable for a long time.

SUMMARY OF THE INVENTION

Accordingly, an object of the present invention is to provide a curable organopolysiloxane composition capable of producing silicone films having stable release properties, irrespective of curing conditions and any type of time passage after the formation thereof.

Thus, the present invention provides a curable organopolysiloxane composition comprising:

(A) 100 parts by weight of an organopolysiloxane having at least two silicon-bonded aliphatic unsaturated hydrocarbon groups in its molecule, (B) an organohydrogenpolysiloxane represented by the general formula (I):

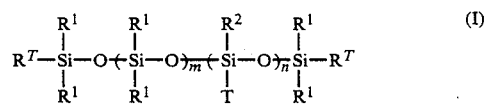

wherein $R^1$ and $R^2$ are each a substituted or unsabstituted monovalent hydrocarbon group containing no aliphatic unsaturated hydrocarbon groups, T is a group represented by the general formula (II)

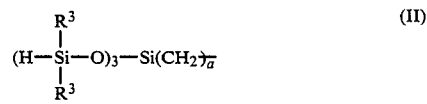

where $R^3$ has the same meaning as $R^1$ and a is an integer of 2 or 3, $R^T$ represents $R^1$ or T as defined above, m and n are each an integer of 0 to 2,000 and satisfy $2 \leq m+n \leq 2,000$, provided that n is not 0 when $R^T$ is $R^1$, in an amount such that the molar ratio of the silicon-bonded hydrogen atoms in this Component (B) to the silicon-bonded aliphatic unsaturated hydrocarbon groups in said Component (A) is 0.5 to 4.0, and (C) at least 0.0001 part by weight of a platinum catalyst in terms of platinum.

The curable organopolysiloxane composition according to the present invention can be sufficiently cured by heating at relatively low temperatures for a short period of time. Since the silicone film obtained by curing has stable release properties, the peel force required between the silicone film and a sticking adhesive applied thereto is markedly stable and therefore does not change under the influence of the change of curing conditions or the length of time passage after the formation of the silicone film.

DETAILED DESCRIPTION OF THE INVENTION

By "pre-adhesion time passage" as used herein is meant the passage of time from the formation of a silicone film by curing to the application of a sticking adhesive on the silicone film. By "post-adhesion time passage" as used herein meant the passage of time from the application of a sticking adhesive on a silicone film to the peeling of the adhesive from the silicone film.

The aliphatic unsaturated hydrocarbon group contained in the organopolysiloxane used as Component (A) constituting the composition of the present invention is not limited as long as the silicon-bonded hydrogen atoms contained in Component (B) can add thereto. The organopolysiloxanes of Component (A) include, for example, one represented by the following general unit formula:

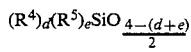

wherein $R^4$ is an aliphatic unsaturated hydrocarbon group such as an alkenyl group, e.g., vinyl, allyl and the like and or alkynyl group, e.g., ethynyl and the like, and may be usually vinyl group. $R^5$ is a monovalent hydrocarbon group such as an alkyl group, e.g., methyl, ethyl, propyl, butyl and the like; a cycloalkyl group, e.g., cyclohexyl and the like; an aryl group, e.g., phenyl, naphtyl, tolyl, xylyl and the like, and substituted monovalent hydrocarbon groups of these. d denotes a number of $0 < d \leq 3$, and e denotes a number of $0 \leq e < 3$, provided that d and e satisfy $1 \leq d+e \leq 3$, and having at least two silicon-bonded aliphatic unsaturated hydrocarbon groups in its molecule. The group represented by $R^5$ is required not to interrupt the addition described above and includes monovalent hydrocarbon groups in which one or more hydrogen atoms bonded to carbon atoms have been substituted by halogen atom such as fluorine, chlorine and bromine, cyano group, etc., for example, chloromethyl group, trifluoropropyl group, cyanomethyl group, etc. Particularly preferred $R^5$ is methyl group.

The molecular structure of the organopolysiloxane of Component (A) may be linear, branched or resinous. Preferred is a linear molecule terminated with dimethylvinylsilyl, methyldivinylsilyl or trivinylsilyl groups at both ends thereof. The number of the aliphatic unsaturated hydrocarbon groups in the organopolysiloxane of Component (A) should be at least 2, and, in general, the ratio of the aliphatic unsaturated hydrocarbon groups in all the organic groups in the molecule may be preferably 0.2 to 5.0 mole %, depending on the purpose for use. The molecular weight of Component (A) is not limited, but low molecular weight organopolysiloxanes with 50 or less of silicon atoms are unfavorable. Preferred are organopolysiloxanes having a viscosity at 25 °C. of 100 cP or more, more preferably 100 to 10,000,000 cP.

Thus, a preferred typical example of the organopolysiloxane of Component (A) is a linear dimethylpolysiloxane terminated with dimethylvinylsilyl group, methyldivinylsilyl group or trivinylsilyl group and having a viscosity of 100 to 10,000,000 cP at 25 °C.

In the general formula (I) representing the organohydrogenpolysiloxane of Component (B) constituting the composition of the present invention, $R^1$, $R^2$ and $R^3$ each represent, for example, an alkyl group such as methyl, ethyl, propyl and butyl; a cycloalkyl group such as cyclohexyl group; an aryl group such as phenyl, naphthyl, tolyl and xylyl; and substituted hydrocarbon groups of these in which part or all of the hydrogen atoms bonded to the carbon atoms have been substituted by one or more of halogen atoms such as fluorine, chlorine and bromine, cyano group and the like. The substituted hydrocarbon groups include, for example, chloromethyl, trifluoropropyl, cyanomethyl and the like. Among these substituted or unsubstituted monovalent hydrocarbon groups, the most preferred is methyl group. Further, m and n are each an integer of 0 to 2,000, preferably 5 to 100, and are required to satisfy $2 \leq m+n \leq 2,000$, preferably $10 \leq m+n \leq 200$. The sum of $m+n$ less than 2 results in insufficient curing rate, and $m+n$ more than 2,000 does not improve the performances of the composition any more and make it difficult to produce the organohydrogenpolysiloxane of Component (B). In view of the rate of curing reaction and adhesion of the composition to substrates, the ratio of silicon atoms having Si—T bond in the silicon atoms contained in Component (B) is preferably at least 20 %, more preferably 20 to 80 %. Next, in the group of the formula:

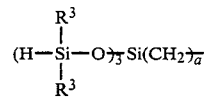

represented by T, a is an integer of 2 or 3. The integers 2 and 3 are equivalent with respect to the performances of the composition achieved, but the integer 2 make it more advantageous to produce Component (B). $R^T$ denotes T or $R^1$. Where $R^T$ is T, Component (B) may be more excellent in curing reaction.

Thus, a preferred typical example of the organohydrogenpolysiloxane of Component (B) is one represented by the general formula (III):

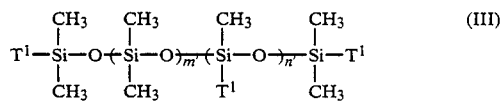

wherein $T^1$ is a group represented by the formula:

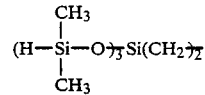

and m' and n' are each an integer of 5 to 100, provided that $m'+n'$ is 10 to 200, and having a ratio of silicon atoms having Si—$T^1$ silicon atoms contained in its molecule of 20 to 80 %.

As Component (A) or (B), the organopolysiloxane or organohydrogenpolysiloxane described above may be used singly or in combination of two or more, respectively. Organohydrogenpolysiloxanes known conventionally may be used in combination with Component (B) of the invention within an amount which does not impare the effects of the present invention.

The amount of Component (B) is such that the molar ratio of silicon-bonded hydrogen atoms in Component (B) to siliconbonded aliphatic unsaturated hydrocarbon groups in Component (A) is 0.5 to 4.0, preferably 1.0 to 3.0. The molar ratio less than 0.5 may result in insufficient curing rate of the composition. The ratio more than 4.0 may result in lowering in the release properties of cured films obtained from the composition and make large the change of release properties with time.

As the platinum catalyst of Component (C) constituting the composition of the present invention, can be used platinum catalysts conventionally known for use in addition of an Si-H bond to an aliphatic unsaturated hydrocarbon group bonded to silicon atom. The platinum catalysts include, for example, platinum black, solid platinum supported on a carrier such as almina and silica, chloroplatinic acid, alcohol-modified chloroplatinic acid, complexes of platinic acid with an olefin, reaction products of platinic acid with an unsaturated group-containing organopolysiloxane. The amount of Component(C) is at least 0.0001 part by weight, preferably 0.001 to 0.1 part by weight in terms of platinum per 100 parts by weight of Component (A). The amount less than 0.0001 part by weight of Component (C) may result in insufficiency in catalitic effect. The amount greater than 0.1 part by weight does not increase the catalytic effect achieved any more and therefore is economically unadvantageous.

In addition to Components (A) to (C) as described above, the composition of the present invention may optionally contain various kinds of organic nitrogen compounds, organic phosphorus compounds, acetylene compounds etc. for the purpose of extending the pot life of the composition or controlling the activity of the platinum catalyst at room temperature. The composition of the present invention may also contain an adhesion improver such as aminopropyltriethoxysilane, vinyltriacetoxysilane or partial hydrolysate thereof for preventing the silicone films being rubbed off from the surface of substrates, or may contain a filler such as silica for the purpose of flatting, etc.

The composition according to the present invention is mainly used as a coating material for forming films having releasability on various substrates. The substrates include, for example, processed papers such as kraft paper, polyethylene laminated paper and glassine paper and various kinds of plastic films.

When the composition of the present invention is applied to a substrate, the composition may be previously diluted with an organic solvent such as toluene, xylene, trichloroethylene, perchloroethylene, hexane, ethyl acetate and methyl ethyl ketone or previously emulsified with addition of an emulsifier in water, followed by subjecting to application by way of known application methods using a roll coater, gravure coater, air coater, bar coater, etc. The coated film thus obtained is subjected to heating treatment at 80 ° C. or higher, preferably 100 ° C. or higher for 10 sec. or more or subjected to irradiation with UV ray for a short period of time to form a cured film with release properties.

The present invention will now be described in more detail by way of examples below. In the example, "part(s)" means part(s) by weight, and viscosities were all measured at 25 ° C.

EXAMPLES

Synthesis Example 1

Synthesis of methylhydrogenpolysiloxane (1) A 500 ml four necked-flask equipped with a stirrer, thermometer, dropping funnel and reflux condenser was charged with 118 g of vinyltrimethoxysilane and 0.1 g of 5% chloroplatinic acid solution in isopropyl alcohol. The mixture was heated to 80° to 90 ° C., and then 108 g of methylhydrogenpolysiloxane represented by the formula:

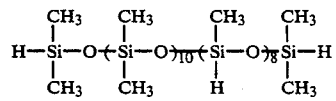

was added thereto from the dropping funnel over about one hour to carry out reaction. The reaction mixture was then maintained under the same conditions for three hours, followed by cooling.

(2) A 3 l three-necked flask equipped with a stirrer, thermometer and dropping funnel was charged with 250 g of water, 500 g of 35% hydrochloric acid and 250 g of isopropyl alcohol. The mixture was cooled to 5 ° C. on an ice-water bath, and then to the mixture was added dropwise from the dropping funnel over about 30 min. a mixture of 210 g of the product obtained in the above (1) and 220 g of tetramethyldisiloxane, resulting that the inner temperature rose up to 17 ° C. Subsequently, 500 g of toluene was added to the reaction mixture followed by carrying out reaction under stirring at a temperature of 20 °C. or less for five hours. After the reaction, the upper layer of separated two layers was taken out, washed with water to become neutral and then heated under reduced pressure (the final conditions: 80 ° C./10 mmHg) to remove toluene and low-boiling fractions, thereby giving methylhydrogenpolysiloxane having the structure represented by the formula:

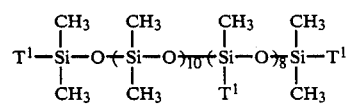

where $T^1$ is as defined above, and having a viscosity of 18 cP and a hydrogen gas yield of 118 ml/g. (This is hereinafter referred to as H-1).

Synthesis Example 2

Synthesis of methylhydrogenpolysiloxane

The procedures taken in Synthesis Example 1 was repeated in the same manner except that the methylhydrogenpolysiloxane used in (1) of Synthesis Example 1 was replaced with the methylhydrogenpolysiloxane represented by the formula:

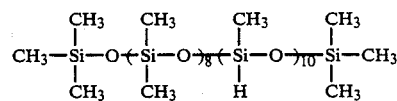

As the result, obtained was methylhydrogenpolysiloxane having the structure represented by the formula:

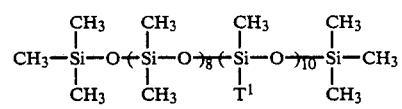

where $T^1$ is as defined above, ånd having a viscosity of 16 cP and a hydrogen gas yield of 123 ml/g. (This is hereinafter referred to as H-2).

Synthesis Example 3

Synthesis of methylhydroqenpolysiloxane (1) A 500 ml four necked-flask equipped with a stirrer, thermometer, dropping funnel and reflux condenser was charged with 30 g of vinyltrimethxysilane and 0.1 g of 1 % chloroplatinic acid solution in isopropyl alcohol. The mixture was heated to 80° to 90 ° C., and then 164 g of methylhydrogenpolysiloxane represented by the formula:

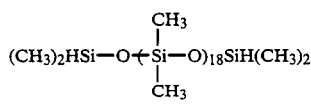

was added thereto from the dropping funnel over about one hour to carry out reaction. The reaction mixture was then maintained under the same conditions for three hours, followed by removal of toluene under reduced pressure.

(2) A 2 1 three-necked flask equipped with a stirrer, thermometer and dropping funnel was charged with 100 g of water, 200 g of 35% hydrochloric acid and 100 g of isopropyl alcohol. The mixture was cooled to 5 ° C. on an ice-water bath, and then to the mixture was added dropwise from the dropping funnel over about 30 min. a mixture of 180 g of the product obtained in the above (1) and 60 g of tetramethyldisiloxane, resulting that the inner temperature rose up to 16 ° C. Subsequently, 200 g of toluene was added to the reaction mixture followed by carrying our reaction under stirring at a temperature of 20 ° C. or less for five hours. After the reaction, the upper layer of separated two layers was taken out, washed with water to become neutral and then heated under reduced pressure (the final conditions: 80 ° C./10 mmHg) to remove toluene and low-boiling fractions, thereby giving methylhydrogenpolysiloxane having the structure represented by the formula:

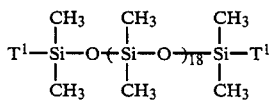

where $T^1$ is as defined above, and having a viscosity of 15 cP and a hydrogen gas yield of 38 ml/g. (This is hereinafter referred to as H-3).

Example 1

To 1,000 g of methylvinylpolysiloxane V-1 represented by the formula [V-1]

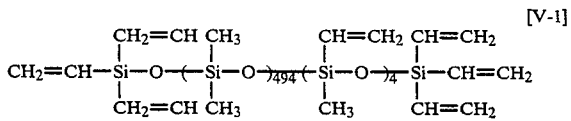

and having a viscosity of 5,100 cP, 55.9 g of the methylhydrogenpolysiloxane H-1 obtained in Synthesis Example 1 was added in an amount of 55.9 g such that the molar ratio of silicon-bonded hydrogen atoms in H-1 to silicon-bonded vinyl groups in V-1 is 1.5, and 10 g of a complex of chloroplatinic acid with vinylsiloxane (i.e., 0.1 g in terms of platinum) was also added, followed by mixing these components homogeneously to prepare a silicone composition solution.

This silicone composition solution was uniformly applied to polyethylene-laminated high-quality papers with a bar coater so as to form coated films in an amount of 0.8 g/m². The coated films were cured by heating in a circulating hot air oven under two conditions, that is, at 100° C. for 20 sec. (hereinafter referred to as "low temperature curing"), or at 150° C. for 20 sec. (hereinafter referred to as "usual curing"). With use of the polyethylene-laminated papers on which the silicone films have been formed for test samples, the silicone films were tested for curing properties, release properties and change of the release properties with time by the methods described below. The results are given in Table 1.

Estimation of curing properties

The silicone film of a test sample was strongly rubbed with a finger five times. The curing properties were estimated as good and indicated as (A) where no smear or rub-off of the silicone film was observed, estimated as had and indicated as (C) where smear or rub-off of the silicone film was clearly observed, and indicated as (B) where smear or rub-off was slightly observed.

Estimation of release properties

The test sample on which a silicone film had been formed was allowed to stand under the conditions of a temperature of 25° C. and a humidity of 65 % RH for 24 hours, and thereafter an acrylic solvent type sticking adhesive(trade name: Oribine BPS-8170, product of Toyo Ink Manufacturing K.K.) was applied to the silicone film in an amount of 50 g/m² in terms of solid content, followed by drying at 100° C. for three min. Subsequently, this was laminated on a high-quality paper with a weight of 52 g/m², and adhered to the paper under pressure, and thereafter the laminated paper thus obtained was allowed to stand at a temperature of 25° C. and a humidity of 65% RH for 24 hours. The laminated paper was then cut into thin test specimens 5 cm wide. The test specimen was subjected to tests to measure peel force, i.e., the force required to peel the high-quality paper from the silicone film on the test sample at a peel angle of 180° and a peeling rate of 0.3 m/min by means of a tensile testing machine (autograph produced by Shimazu Seisakusho K.K.). The peel force thus measured was assumed as the initial peel force, of which unit is g/5 cm.

Estimation of the change of release properties with time (1) Change of release properties after pre-adhesion time passage Peel force was measured in the same manner as in the estimation of release properties as described above except that the test sample before the application of the adhesive thereto was allowed to stand under the conditions of a temperature of 25° C. and a humidity of 65% RH for 14 days instead of 24 hours. The peel force thus measured is indicated as the peel force after pre-adhesion time passage, the unit of which is g/5 cm.

(2) Change of release properties after post-adhesion time passage

Peel force was measured in the same manner as in the estimation of release properties as described above except that the test sample after laminated on the high-quality paper under pressure was allowed to stand under the conditions of a temperature of 25° C. and a humidity of 65% RH for 14 days instead of 24 hours. The peel force thus measured is indicated as the peel force after post-adhesion time passage, the unit of which is g/5 cm.

Comparative Examples 1 and 2

Silicone compositions were prepared, and silcone films were formed and tested in the same manner as in Example 1 except that the methylhydrogenpolysiloxne H-4 (Comparative Example 1) or H-5 (Comparative Example 2) shown below was used in place of H-1. The results are given in Table 1.

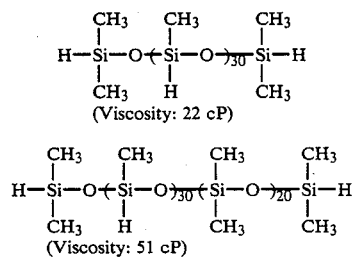
(Viscosity: 22 cP) [H-4]

(Viscosity: 51 cP) [H-5]

TABLE 1

|  | Example 1 | | Comparative Example 1 | | Comparative Example 2 | |
| --- | --- | --- | --- | --- | --- | --- |
|  | H | L*1 | H | L | H | L |
| Curing properties | A | A | B | A | B | A |
| Initial peel force | 32 | 29 | 45 | 35 | 42 | 34 |
| Peel force after pre-adhesion time passage | 29 | 28 | 37 | 30 | 33 | 30 |
| Peel force after time passage | 35 | 30 | 60 | 44 | 54 | 40 |

Note;
*1 H, Usual curing (150° C.)
L, Low temperature curing (100° C.)

Examples 2 to 10

Silicone composition solutions as shown in Table 2 were prepare by combining any one of the organopolysiloxanes containing vinyl group V-2, V-3 and V-4 shown below as Component (A) and one or two of the organohydrogenpolysiloxanes H-1, H-2 and H-3 as described above as Component (B) in such a way that the molar ratio of the silicon-bonded hydrogen atoms in Component (B) to the silicon-bonded vinyl groups in Component (A) is 1.5. Using these composition solutions, silicone films were formed in the same manner as in Example 1 and tested for the properties. The results are given in Table 3.

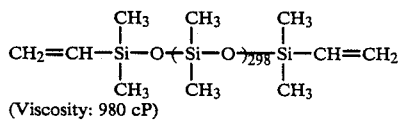
(Viscosity: 980 cP) [V-2]

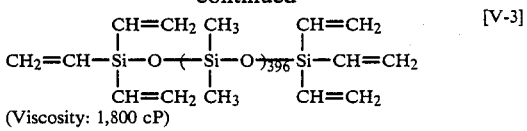
(Viscosity: 1,800 cP) [V-3]

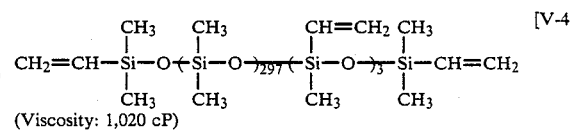
(Viscosity: 1,020 cP) [V-4]

Comparative Examples 3 to 5

Silicone composition solutions as given in Table 2 were prepared in the same manner as in Examples 2 to 10 except for using the organohydrogenpolysiloxane H-6 represented by the formula [H-6]:

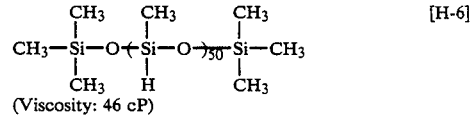
(Viscosity: 46 cP) [H-6]

as Component (B) and any one of the organohydrogenpolysiloxanes V-2, V-3 and V-4 as Component (A). Using the composition solutions, silicone films were prepared and tested for the properties in the same manner as in Example 1. The results are given in Table 3.

TABLE 2

|  | Component (A) | Component (B) |
| --- | --- | --- |
| Examples |  |  |
| 2 | V-2 | H-1 |
| 3 | V-3 | " |
| 4 | V-4 | " |
| 5 | V-2 | H-2 |
| 6 | V-3 | " |
| 7 | V-4 | " |
| 8 | V-2 | H-1, H-3 (Molar ratio of H-1/H-3 = 70/30) |
| 9 | V-3 | H-1, H-3 (Molar ratio of H-1/H-3 = 70/30) |
| 10 | V-4 | H-1, H-3 (Molar ratio of H-1/H-3 = 70/30) |
| Comparative Examples |  |  |
| 3 | V-2 | H-6 |
| 4 | V-3 | " |
| 5 | V-4 | " |

TABLE 3

|  | Curing properties | | Initial peel force | | Peel force after pre-adhesion time passage | | Peel force after post-adhesion time passage | |
| --- | --- | --- | --- | --- | --- | --- | --- | --- |
|  | L | H | L | H | L | H | L | H |
| Example 2 | A | A | 24 | 20 | 22 | 19 | 26 | 21 |
| Example 3 | A | A | 35 | 32 | 32 | 30 | 36 | 33 |
| Example 4 | A | A | 34 | 32 | 31 | 30 | 35 | 34 |
| Example 5 | A | A | 25 | 23 | 24 | 22 | 27 | 24 |
| Example 6 | A | A | 27 | 25 | 25 | 23 | 28 | 26 |
| Example 7 | A | A | 28 | 26 | 26 | 25 | 29 | 26 |
| Example 8 | A | A | 18 | 16 | 15 | 16 | 19 | 17 |
| Example 9 | A | A | 20 | 19 | 18 | 17 | 21 | 20 |
| Example 10 | A | A | 21 | 21 | 19 | 20 | 22 | 22 |
| Comparative Example 3 | B | A | 30 | 23 | 24 | 20 | 44 | 29 |
| Comparative 4 | B | A | 48 | 35 | 36 | 32 | 58 | 42 |

TABLE 3-continued

|  | Curing properties | | Initial peel force | | Peel force after pre-adhesion time passage | | Peel force after post-adhesion time passage | |
| --- | --- | --- | --- | --- | --- | --- | --- | --- |
|  | L | H | L | H | L | H | L | H |
| Example |  |  |  |  |  |  |  |  |
| Comparative 5 Example | B | A | 45 | 33 | 35 | 30 | 57 | 42 |

L: low temperature curing (100° C.),
H: usual curing (150° C.)

Examples 11 to 13

The vinylpolysiloxane V-5 represented by the formula [V5]

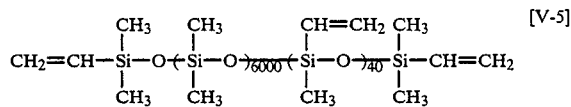

[V-5]

was synthesized. V-5 was rubber-like. It was homogeneously dissolved in toluene in a concentration of 30% by weight in terms of siloxane content to form a solution having a viscosity of 5,700 cP. Silicone composition solutions were prepared by combining V-5 as Component (A) with one or two of H-1, H-2 and H-3 as Component (B) as given in Table 4 in such a way that the molar ratio of silicon-bonded hydrogen atoms in Component (B) to silicon-bonded vinyl groups in Component (A) is 1.5 and diluting with toluene to form solutions with 10% by weight of siloxane content. Using these composition solutions, silicone films were prepared in the same manner as in Example 1 and tested for the properties. The results are given in Table 5.

Comparative Example 6

A silicone composition solution with 10% by weight of siloxane content was prepared by combining said methylvinylpolysiloxane V-5 and said methylhydrogenpolysiloxane H-4 and diluting with toluene. Using the solution, a silicone film was prepared and tested for the properties in the same manner as in Example 1. The results are given in table 5.

TABLE 4

|  | Component (A) | Component (B) |
| --- | --- | --- |
| Example 11 | V-5 | H-1 |
| Example 12 | V-5 | H-2 |
| Example 13 | V-5 | H-1 and H-3 (mole ratio 70:30) |
| Comparative Example 6 | V-5 | H-4 |

TABLE 5

|  | Curing properties | | Peel force | | | | | |
| --- | --- | --- | --- | --- | --- | --- | --- | --- |
|  |  | | Initial | | After pre-adhesion time passage | | After post-adhesion time passage | |
|  | L | H | L | H | L | H | L | H |
| Example 11 | A | A | 21 | 18 | 19 | 18 | 23 | 20 |
| Example 12 | A | A | 23 | 20 | 20 | 19 | 25 | 21 |
| Example 13 | A | A | 23 | 19 | 20 | 18 | 24 | 21 |
| Comparative 6 Example | B | A | 42 | 26 | 29 | 24 | 50 | 31 |

Note:
L, low temperature curing (100° C.)
H, usual curing (150° C.)

Comparative Examples 7 and 8

The procedures of Example 1 were repeated except that the methylhydrogenpolysiloxane H-1 was used in an amount of 14.9 g (Comparative Example 7) or 223.6 g (Comparative Example 8). The molar ratio of silicon-bonded hydrogen atoms in H-1 to silicon-bonded vinyl groups in V-1 was 0.4 in Comparative Example 7 and 6 in Comparative Example 8. The results of measurement of the properties are as given in Table 6.

TABLE 6

|  | Comparative Example | | | |
| --- | --- | --- | --- | --- |
|  | 7 | | 8 | |
|  | L | H | L | H |
| Curing properties | C | B | A | A |
| Peel force |  |  |  |  |
| Initial | 66 | 38 | 80 | 55 |
| After pre-adhesion time passage | 50 | 30 | 32 | 30 |
| After post-adhesion time passage | 85 | 35 | 115 | 90 |

Note;
L, Low temperature curing (100° C.)
H, usual curing (150° C.)

What is claimed is:

1. A curable organopolysiloxane composition comprising:
   (A) 100 parts by weight of an organopolysiloxane having at least two silicon-bonded aliphatic unsaturated hydrocarbon groups in its molecule,
   (B) an organohydrogenpolysiloxane represented by the general formula (I):

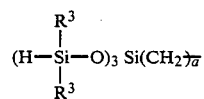

wherein $R^1$ and $R^2$ are each a substituted or unsabstituted monovalent hydrocarbon group containing no aliphatic unsaturated hydrocarbon groups, T is a group represented by the general formula (II):

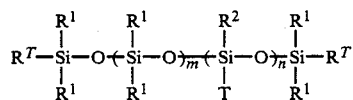 (I)

where $R^3$ has the same meaning as $R^1$ and a is an integer of 2 or 3, $R^T$ represents $R^1$ or T, m and n are each an integer of 0 to 2,000 and satisfy $2 \leq m+n \leq 2,000$, provided that n is not 0 when $R^T$ is $R^1$, in an amount such that the molar ratio of the silicon-bonded hydrogen atoms in said Component (B) to the silicon-bonded aliphatic unsaturated hydrocarbon groups in said Component (A) is 0.5 to 4.0, and (C) at least 0.0001 part by weight of a platinum catalyst in terms of platinum.

2. The composition according to claim 1, wherein the amount of the aliphatic unsaturated hydrocarbon groups in all the organic groups in Component (A) is 0.2 to 5.0 mole %.

3. The composition according to claim 1, wherein the organopolysiloxane of Component (A) is a linear dimethylpolysiloxane terminated with dimethylvinylsilyl group, methylvinylsilyl group or trivinylsilyl group at both ends and having a viscosity of 100 to 10,000,000 cP at 25° C.

4. The composition according to claim 1, wherein $R^1$, $R^2$ and $R^3$ in said general formula (I) representing Component (B) are methyl groups.

5. The composition according to claim 1, wherein T in said general formula (I) representing component (B) is the group of the formula (II)

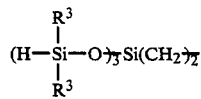

wherein $R^3$ is as defined above.

6. The composition according to claim 1, wherein $R^T$ in the general formula (I) representing Component (B) is T represented by said formula (II).

7. The composition according to claim 1, wherein the organohydrogenpolysiloxane of component (B) contains at least 20% of silicon atoms having Si-T bond based on all the silicon atoms in its molecule.

8. The composition according to claim 7, wherein the organohydrogenpolysiloxane of Component (B) contains 20 to 80% of silicon atoms having Si-T bond based on all the silicon atoms in its molecule.

9. The composition according to claim 1, wherein m and n in said general formula (I) representing Component (B) are each an integer of 5 to 100, provided that m+n is 10 to 200.

10. The composition according to claim 1, wherein the organohydrogenpolysiloxane of Component (B) is represented by the formula (III):

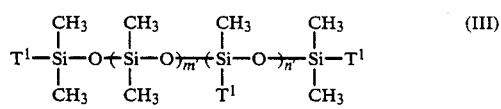 (III)

wherein $T^1$ is the group of the formula:

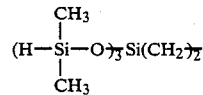

and m' and n' are each an integer of 5 to 100 provided that m+n is 10 to 200, and the amount of silicon atoms having Si-$T^1$ bond based on all the silicon atoms in the molecule is 20 to 80%.

11. The composition according to claim 1, wherein the amount of Component (B) is such that the molar ratio of the silicon-bonded hydrogen atoms in this Component (B) to the silicon-bonded aliphatic unsaturated hydrocarbon groups in said Component (A) is 1.0 to 3.0.

12. The composition according to claim 1, wherein the amount of the platinum catalyst of Component (C) is 0.001 to 0.1 part by weight in terms of platinum.

* * * * *